United States Patent
Burgess et al.

(10) Patent No.: US 9,643,734 B2
(45) Date of Patent: May 9, 2017

(54) ELECTROMAGNETIC ENERGY SURFACE PROTECTION

(71) Applicant: The Boeing Company, Chicago, IL (US)

(72) Inventors: Robert Marshall Burgess, Seattle, WA (US); Joseph A. Marshall, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 562 days.

(21) Appl. No.: 13/845,538

(22) Filed: Mar. 18, 2013

(65) Prior Publication Data
US 2015/0090836 A1  Apr. 2, 2015

(51) Int. Cl.
*B64D 45/00* (2006.01)
*B64D 45/02* (2006.01)

(52) U.S. Cl.
CPC ............. *B64D 45/02* (2013.01); *Y02T 50/433* (2013.01)

(58) Field of Classification Search
CPC ....................................................... B64D 45/02
USPC ........... 29/831, 841, 852–854; 361/216, 217, 361/218
See application file for complete search history.

(56) References Cited

U.S. PATENT DOCUMENTS

| | | | | |
|---|---|---|---|---|
| 4,888,451 A | * | 12/1989 | Toni | .......................... H01R 4/64 174/2 |
| 7,835,130 B2 | * | 11/2010 | Ware | ........................ B32B 33/00 361/218 |
| 2009/0001217 A1 | * | 1/2009 | Dufresne | ................ B64D 45/02 244/119 |
| 2009/0258220 A1 | | 10/2009 | Schaaf et al. | |
| 2012/0063050 A1 | | 3/2012 | Langone et al. | |
| 2013/0216767 A1 | * | 8/2013 | Cinquin | ................ B29C 70/228 428/102 |
| 2013/0271891 A1 | * | 10/2013 | Shimp | ...................... H02H 1/04 361/220 |
| 2014/0151353 A1 | * | 6/2014 | Steinwandel | .......... B64D 15/12 219/202 |
| 2014/0197273 A1 | * | 7/2014 | Steinwandel | ......... B29C 70/885 244/1 A |

FOREIGN PATENT DOCUMENTS

EP  2 511 174  10/2012

OTHER PUBLICATIONS

Extended European Search Report from EP Application Serial No. 14154909.7 dated Aug. 22, 2014.

* cited by examiner

*Primary Examiner* — Joseph W Sanderson
*Assistant Examiner* — Aaron Rodziwicz (57) ABSTRACT

An electromagnetic energy protection system and method disclosed herein that includes a plurality of conductive sheets ohmically connected by conductive interconnects. The conductive interconnects can be metal formed by a metal deposition process. The metal deposition process can include a plasma deposition process. The conductive interconnects can help prevent the formation of surface deformities such as bumps that may be caused when connecting, either physically or electrically, adjacent conductive sheets.

20 Claims, 8 Drawing Sheets

ELECTROMAGNETIC ENERGY SURFACE PROTECTION

BACKGROUND

Commercial and military aircraft are vulnerable to lightning strikes in various phases of their operation. When moving through a highly charged atmosphere, such as a storm, an aircraft can cause a disturbance that motivates lightning to strike the aircraft. In conventional aircraft having a metal skin, such as aluminum, the electrical energy imparted onto the surface of the aircraft from the lighting strike is primarily conducted along the surface of the skin and dissipated from the aircraft using various techniques.

In aircraft constructed using composite matrices that form various components of the aircraft, because the polymeric material that forms the composite structure may not dissipate electrical energy as efficiently as metal, aircraft with composite materials may be equipped with various lightning strike protection technologies. Some technologies include, but are not limited to, a series of wire meshes on the surface of the aircraft skin or embedded into the composite structure to conduct electricity away from vital or important aircraft components. Another technology may be to use one or more layers of graphite cloth and aluminum ply. Conventional techniques for embedding various metallic components into aircraft structures constructed from composite materials can cause surface deformities that may need to be compensated for in order to create smooth surfaces.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the disclosure herein, an aircraft component is provided. The aircraft component may include one or more layers and a conductive layer. The conductive layer may be disposed co-planar and proximate to the one or more layers. The conductive layer may form an electrical disconnect region defined by a gap between adjacent conductive sheets of the conductive layer. The aircraft component can also include an interconnect. The interconnect can include a conductive material that creates an ohmic connection between the adjacent conductive sheets of the conductive layer to bridge the gap in the electrical disconnect region.

According to another aspect, a method for forming a composite structure for an aircraft component is provided. The method may include forming one or more layers and laying down a conductive layer co-planar and proximate to the one or more layers. The conductive layer may include an electrical disconnect region that is defined by a gap between adjacent conductive sheets of the conductive layer. The method may also include filling in at least a portion of the gap between the adjacent conductive sheets by depositing an interconnect. The interconnect may include a conductive material that ohmically connects the adjacent conductive sheets of the conductive layer to bridge the gap in the electrical disconnect region.

According to yet another aspect, a method for providing electromagnetic energy strike protection in an aircraft component is provided. The method may include providing a composite structure for the aircraft component. The composite structure may include one or more layers. The method may also include providing a conductive layer in the one or more layers. The conductive layer may include a first conductive sheet and a second conductive sheet. The method may further include providing an interconnect deposited using a plasma deposition process. The interconnect may include a conductive material that ohmically connects the first conductive sheet to the second conductive sheet. The method may also include routing an electromagnetic strike on the first conductive sheet to the second conductive sheet through the interconnect.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

Aspects disclosed herein allow for electromagnetic energy surface protection using interconnects. When forming an electromagnetic energy ("EME") protection layer, conductive sheets may be laid down onto a surfacing layer or other suitable layer. The conductive sheets are designed to protect various aircraft components from EME strikes by acting as a conduit for EME. When laying down the conductive sheets, the length along the edge of one conductive sheet may not fully contact the edge of an adjacent conductive sheet, forming an electrical disconnect region. The electrical disconnect region can be defined by a gap between the conductive sheets and can include the trailing edge of one conductive sheet and the leading edge of an adjacent conductive sheet. This can create locations where EME from one conductive sheet is not conducted to the adjacent conductive sheet. The locations can reduce the effectiveness of EME protection. As used herein, EME may also include a more general application to the field of Electromagnetic Effects.

Concepts and technologies described herein use an interconnect that creates an ohmic connection between the adjacent conductive sheets. The interconnect may bridge the gap in the electrical disconnect region. In one configuration, the ohmic connection is created by depositing a conductive material in the location of the electrical disconnect. In a configuration, the conductive sheet can be a metal foil sheet. In another configuration, the metal foil sheet can be an expanded metal foil sheet. It should be appreciated that the concepts and technologies described herein are not limited to any particular structure or composition of a conductive sheet. The description herein may use an expanded metal foil section for illustrative purposes only and does not represent an intent to limit the scope of the presently disclosed subject matter to expanded metal foil.

As described above, the interconnect may be deposited into the location of the electrical disconnect. In some configurations, the interconnect can be a metal. In further configurations, the interconnect can be deposited in the location of the electrical disconnect using various deposition techniques. These and other configurations may help create an ohmic connection between conductive sheets to provide effective EME strike protection. In some configurations, using plasma deposited metal to connect conductive sheets can create a smooth surface profile while providing protection against damage that may be caused by lightning strikes. Various aspects presented herein can electrically and physically connect conductive sheets in such a way as to provide adequate electrical isolation to critical physical or electrical components in an aircraft. Some aspects presented herein may provide a surface profile that allows for better composite structure layer buildups.

Figure 1:
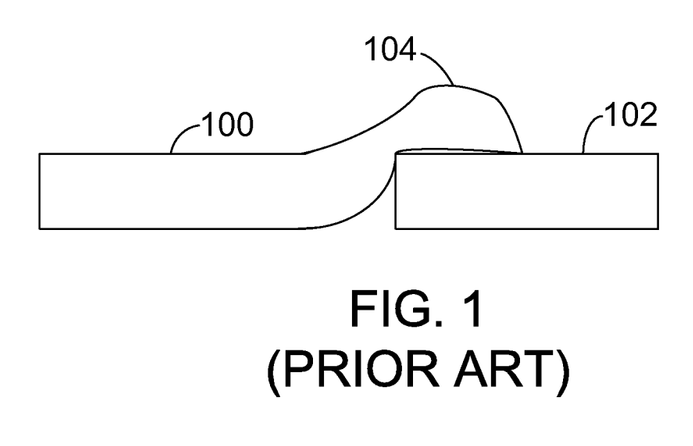
FIG. 1 is a cross section view of a conventional composite aircraft structure illustrating a surface defect.

In some conventional aircraft component construction in which expanded metal foil, or other conductive material, is used as an electrical isolation mechanism, to provide for the physical and electrical connectivity between the expanded metal foil sections, the edges of the metal foil sections are typically overlapped with each other. In some implementations, overlapping the edges of the metal foil sections may help to ensure electrical continuity between the sections. This is illustrated by way of example in FIG. 1. In FIG. 1, a conductive sheet 100 is physically and electrically connected to an adjacent conductive sheet 102 by overlapping an edge of the conductive sheet 100 with an edge of the adjacent conductive sheet 102. The overlapping creates a bump 104 that, in conventional aircraft component design, may need to be accounted for in order to create a smooth surface relatively free of surface defects like the bump 104.

Unless the bumps, such as the bump 104, are accounted for when subsequent composite layers are applied on top of the conductive sheets, the size of the bumps may be magnified to an unacceptable profile suitable for aircraft use. Even if the bumps are accounted for using techniques such as sanding or compression, the physical and molecular structure in and around the bumps may be different than the surrounding portions of the composite layers that form the composite structure. The reason for this may be that the compression of the added material in the bumps to the same height as remaining expanded metal foil section layer can cause the added material to be denser than the surrounding portions because of the additional material from the bumps. Thus, in conventional systems using overlapping expanded metal foil edge technology, a designer of an aircraft component may need to take into account the variable structural characteristics caused by the varying density found in the composite material.

The concepts and technologies described herein can reduce or eliminate the structural inconsistencies caused by surface profile defects by using an interconnect that forms an ohmic connection between electrically disconnected portions of adjacent conductive sheets, while minimizing overlap of the edges of the conductive sheets. As will be described in further detail below, various metal deposition techniques may be used to deposit the interconnects.

Figure 2A:
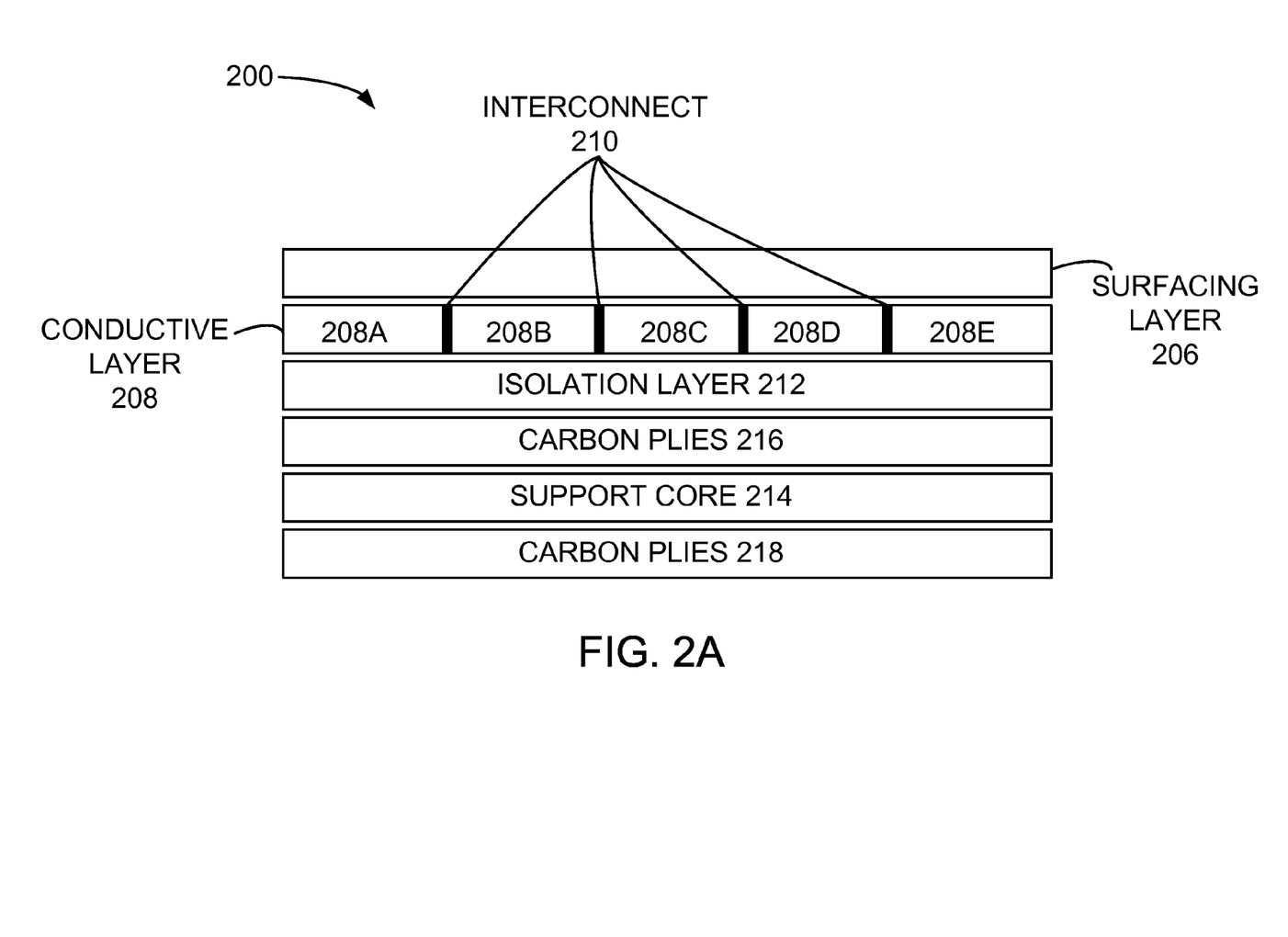
FIG. 2A is a cross section view of a composite aircraft structure, in accordance with an embodiment.

FIG. 2A is a cross sectional view of an aircraft component composite structure 200. It should be appreciated that the composite structure 200 is merely exemplary and does not represent an intent to limit the scope of the present disclosure to composite structures of same or similar construction. The composite structure 200 is formed from multiple layers that, when cured, form an integral structure suitable for its intended purpose on an aircraft. For example, and not by way of limitation, the composite structure 200 can be, or form part of, an aircraft wing, an aircraft fuselage, a horizontal stabilizer, or a vertical stabilizer. The disclosure herein is not limited to any particular aircraft or vehicle component.

The composite structure 200 includes a surfacing layer 206 that forms the "top" of the aircraft component. In other words, the surfacing layer 206 is the layer upon which paint may be applied to create a finished look for the aircraft component. In some examples, the surfacing layer 206 is formed from one or more sheets of resin impregnated fiberglass or other resin ply. The composite structure 200 also includes a conductive layer 208. In some configurations, the surfacing layer 206 may include or incorporate the conductive layer 208. In other configurations, the surfacing layer 206 may be considered as a separate layer from the conductive layer 208. The disclosure herein is not limited to any particular layer configuration, including the requirement of including the surfacing layer 206.

In some configurations, the conductive layer 208 can be configured as rolls of metallic material. A manufacture may roll out the material to a specific length, cut the material to create a conductive sheet, and then reuse the roll for another sheet. In some instances, the conductive sheets can be expanded metal foil. Expanded metal foil is typically a metal sheet that has a series of slits cut into the metal foil sheet. A slight pulling pressure is applied to the metal foil sheet and the metal foil sheet expands because of the slits. Thus, for the same amount of metal, the area coverage of the metal foil sheet can be increased.

The conductive layer 208 can be constructed from individual conductive sheets, illustrated as conductive sheets 208A-208E. The conductive sheets 208A-208E can be positioned in a co-planar configuration to each other and proximate to the surfacing layer 206. As used herein, "proximate" means a location near to, next to, or in contact with another location. The conductive sheets 208A-208E, when in electrical contact, help to form the EME protective layer, or the conductive layer 208. When laid down in a manufacturing process, there may be electrical disconnect regions defined by gaps, locations of electrical disconnect, between adjacent conductive sheets in which the adjacent conductive sheets do not touch or form an ohmic connection, illustrated in FIG. 4A and described below. The locations of electrical disconnect may be reduced or eliminated by using interconnects 210. The interconnects 210 may be a conductive material, such as a metal or metal alloy, which is deposited in the locations of electrical disconnect. The deposition can create an ohmic connection between the conductive sheets 208A-208E that are adjacent to each other.

Various types of metals can be used for the conductive sheets and the interconnects. In some embodiments, the conductive sheets or the interconnects can be a metal such as, but not limited to, aluminum, gold, silver, titanium, or copper, or various alloys thereof. The choice of metals may vary depending on the particular characteristics or costs associated with the aircraft component being constructed. For example, extremely sensitive components may be protected from electromagnetic energy using expanded metal foil made from gold, a highly conductive metal with a low oxidation potential. But, the cost and weight of using gold may not be practical. Therefore, the same components, and other components, may be protected using expanded metal foil sections made from aluminum or copper, less expensive metals with adequate conductivity. The concepts and technologies described herein are not limited to any design choice for a particular metal.

The composite structure 200 can also include any number and type of material layers according to the desired implementation. For example, an isolation layer 212 may include one or more layers of resin-reinforced fiberglass ply. The isolation layer 212 can help to prevent galvanic corrosion and help ameliorate thermal expansion mismatch effects that can cause the paint and other parts of the composite structure 200 to deteriorate. The composite structure 200 can also include a support core 214 encapsulated by layers of carbon plies 216 and 218. The support core 214 can help to increase the structural rigidity to the composite structure 200 along with the carbon plies 216 and 218.

Figure 2B:
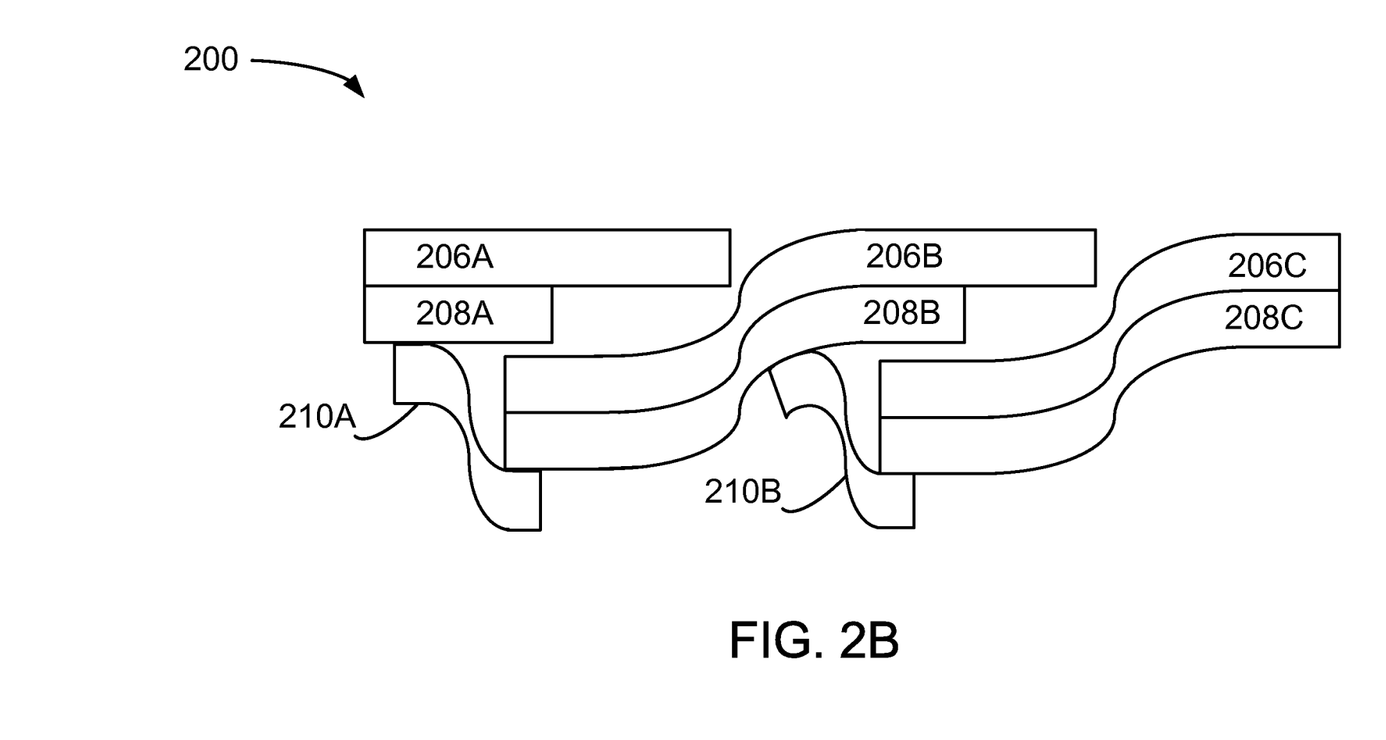
FIG. 2B is a cross section view of an alternate composite aircraft structure, in accordance with an embodiment.

FIG. 2B is a cross sectional view of an aircraft component composite structure 200 in an alternate configuration. In some configurations, the surfacing layer 206 and the conductive layer 208 may be co-bonded prior to the layup process. When co-bonded prior to the layup process, the surfacing layer 206 can be overlapped at various locations to reduce or eliminate seams at the surfacing layer 206. The seams may allow water or other contaminants to enter the structure and damage the underlying composite structure 200. In the configuration of FIG. 2B, the surfacing layer 206 is laid down in sections, illustrated as surfacing sections 206A, 206B and 206C, which together form the surfacing layer 206. Further, in the configuration of FIG. 2B, the conductive layer 208 is laid down in sections onto the surfacing sections 206A, 206B, and 206C, illustrated as conductive sections 208A, 208B, and 208C, which together form the conductive layer 208.

When in the layup configuration, there may be an electrical open between the various sections. For example, Conductive section 208A may not be in electrical contact with conductive section 208B because the surfacing section 206B is located between the two. To provide for electrical connectivity in the configuration illustrated in FIG. 2B, interconnects 210A and 210B are configured to bridge the overlap of their respective surfacing sections 206A, 206B, and 206C and conductive sections 208A, 208B, and 208C. It should be noted that the physical placement of various illustrated components are merely to illustrate the concepts and technologies described herein. It should be appreciated that the concepts and technologies described herein are not limited to any particular manner in which the layers forming the composite structure 200 are laid down or positioned.

Figure 3:
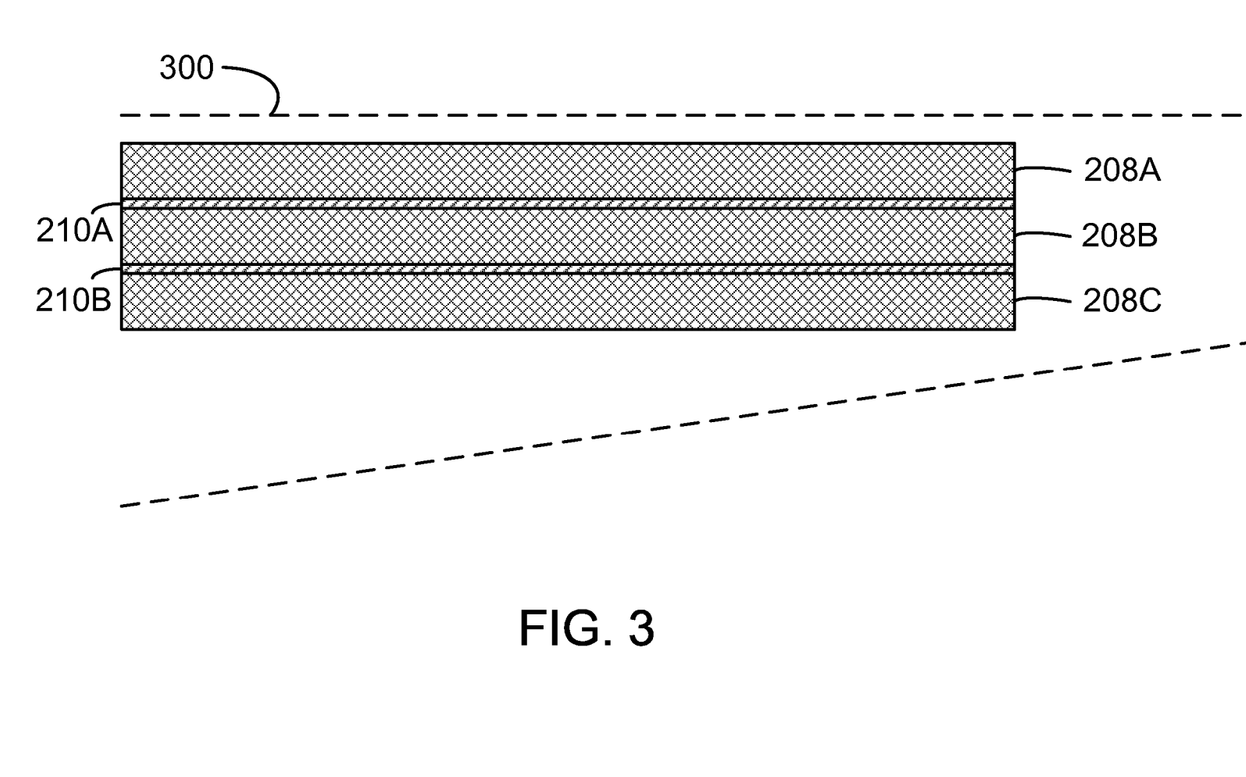
FIG. 3 is a top view of conductive sheets in an aircraft wing, in accordance with an embodiment.

FIG. 3 is a top section view of a partially constructed, composite aircraft wing 300. The aircraft wing 300 includes an electromagnetic energy barrier formed from the conductive sheets 208A-208C. The conductive sheets 208A-208C are disposed proximate to one another to form the conductive layer 208 of the aircraft wing 300. To increase the probability that the edges of adjacent conductive sheets are ohmically connected, the interconnects 210A and 210B are disposed between the edges of their respective conductive sheets 208A-208C. The interconnects 210A and 210B can be formed from metal deposited using various metal deposition technologies, as described below.

The interconnects 210A and 210B can electrically connect the conductive sheets 208A-208C to each other to create a continuous electrical conduit to protect components from electromagnetic energy and to dissipate that electromagnetic energy. The interconnects 210A and 210B can also physically secure the conductive sheets 208A-208C to each other. Although when fully formed and cured composite structure of the aircraft wing 300 may partially or fully immobilize the conductive sheets 208A-208C, it may be beneficial in certain configurations to further secure the conductive sheets 208A-208C using the interconnects 210A and 210B.

Figure 4A:
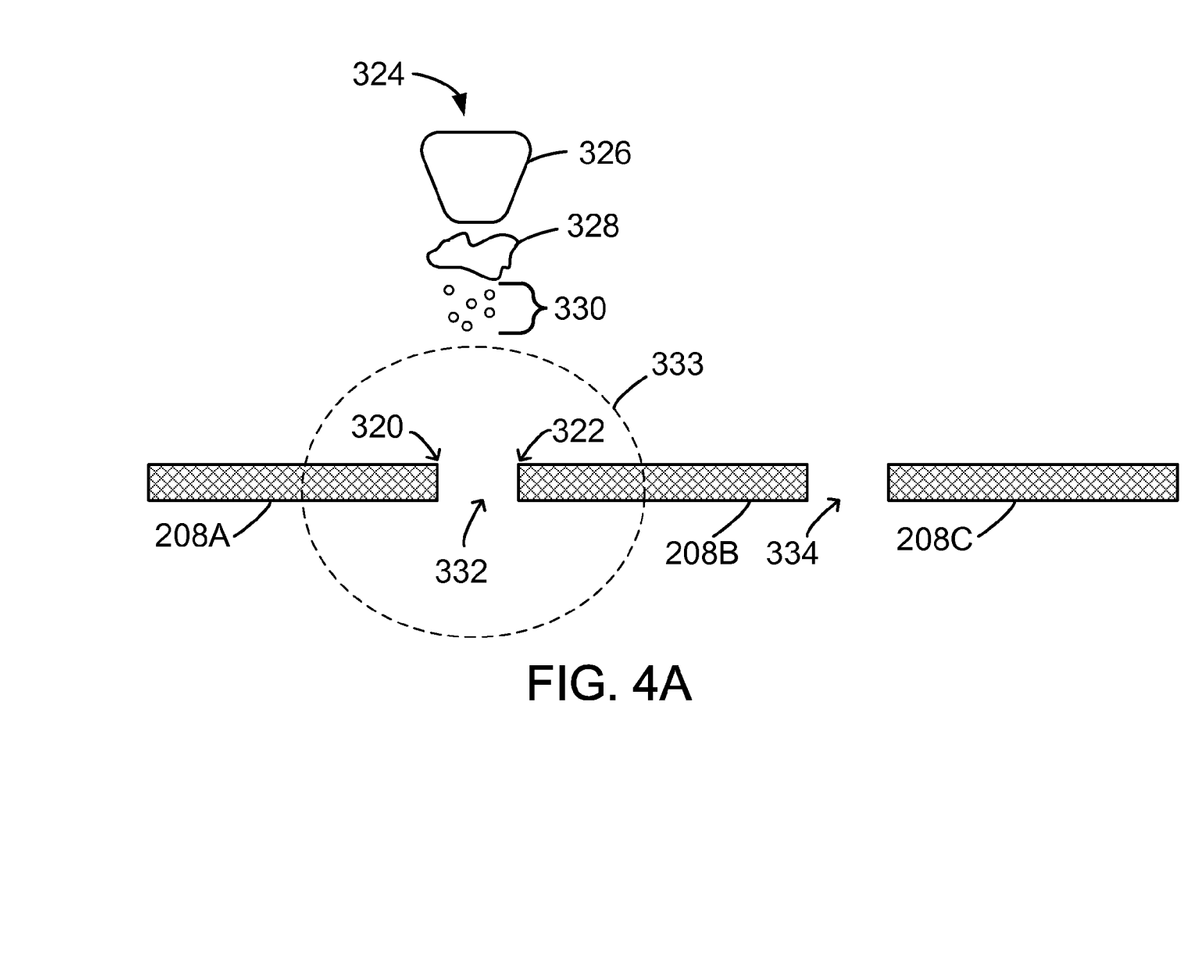
FIG. 4A is a cross section side view of adjacent conductive sheets prior to the deposition of an interconnect.
Figure 4B:
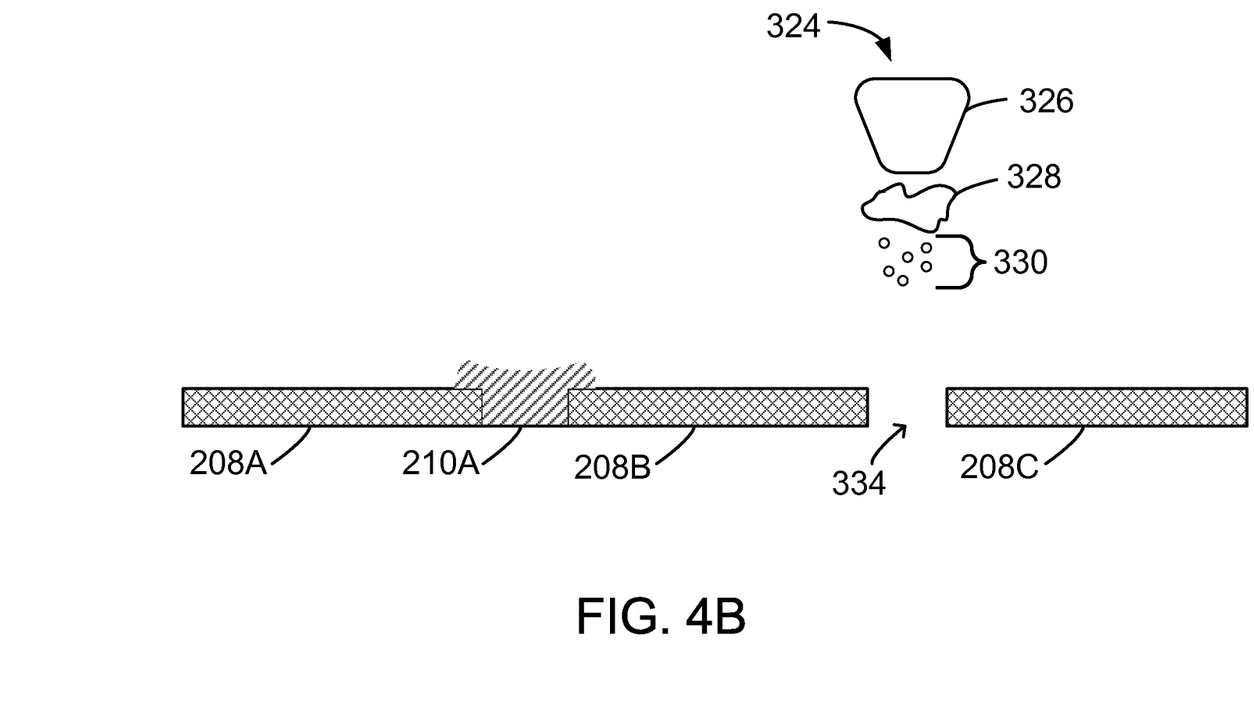
FIG. 4B is a cross section side view of adjacent conductive sheets after the deposition of an interconnect, in accordance with an embodiment.

FIGS. 4A and 4B will be used to describe the metal interconnect 210 deposition process according to various embodiments. FIG. 4A is a cross sectional side view showing conductive sheets 208A-208C that are disposed adjacent and proximate to each other. The conductive sheets 208A-208C can be laid down from rolls over the surfacing layer 206. Prior to the deposition of the metal forming the interconnects 210A and 210B, the edges of the conductive sheets 208A-208C are placed proximate to one another. For example, metal foil section 208A trailing edge 320 is placed proximate to conductive sheet 208B leading edge 322. Also illustrated is an electrical disconnect 332. The electrical disconnect 332 is a gap between the trailing edge 320 and the leading edge 322, delineated as an electrical disconnect region 333. In one implementation, the electrical disconnect region 333 can be defined as the region including the electrical disconnect 332 between the trailing edge 320 and the leading edge 322.

As discussed above, the interconnect 210A can create an ohmic connection between the trailing edge 320 and the leading edge 322 to bridge the electrical disconnect 332 in the electrical disconnect region 333. The trailing edge 320 or the leading edge 322 can be prepared to receive the deposited metal that will form the interconnect 210A. For example, the surface of the trailing edge 320 or the leading edge 322 can be altered using plasma or solid particles to create a rough surface that may more readily accept and bond to the deposited metal. Other edge surface techniques may be used and are considered to be within the scope of the present disclosure.

When the conductive sheets 208A-208C are placed in a location suitable for connection to each other and the surface of the trailing edge 320 or the leading edge 322 is ready to accept deposited metal, a metal deposition operation is commenced. In the configuration illustrated in FIG. 4A, metal may be deposited using plasma deposition. One example of plasma deposition is hot plasma that expels metal particles from a metal plate. In some implementations, the hot plasma may be in the form of an arc. The metal particles are directed to the electrically disconnected portions. Other deposition techniques may be used and are considered to be within the scope of the present disclosure. A plasma deposition process is described herein for descriptive purposes only. Further, the plasma deposition process described herein is to be considered a generic plasma deposition process, and any specific implementation or configuration is for descriptive purposes only.

Continuing with FIG. 4A, a plasma deposition operation is commenced using plasma deposition tool 324. The plasma deposition tool 324 includes a metal plate 326 that provides the metal to be deposited into the electrical disconnect 332 to form the metal interconnect 210A, as shown by way of example in FIG. 4B. As described above, the metal forming the metal plate 326 may vary depending on the design considerations for the particular application. A plasma 328 is formed that causes particles 330 of the metal plate 326 to come off and move towards the electrical disconnect 332. In some configurations, the metal plate 326 can be an electrode, while a second electrode (not shown) can be disposed proximate to the electrical disconnect 332. The two electrodes can be configured to cause the formation of the plasma 328 and to accelerate the particles 330 towards the electrical disconnect 332.

Over a period of time, the particles 330 collect in the electrical disconnect 332 to form the metal interconnect 210A, as shown in FIG. 4B. The amount of particles 330 allowed to collect in the electrical disconnect 332 to form the metal interconnect 210A may vary depending on the design parameters of the particular implementation. For example, in some implementations, a high degree of electrical or physical connectivity may be required. In that implementation, a relatively large amount of the particles 330 may be allowed to collect in the electrical disconnect 332.

In other implementations, only a relatively small degree of electrical or physical connectivity may be required. In that embodiment, a relatively small amount of the particles 330 may be allowed to deposit in the electrical disconnect 332. In further configurations, the amount of the particles 330 allowed to collect in the electrical disconnect 332 may be so that the interconnect 210A is flush or substantially flush with the conductive sheet 208A and the conductive sheet 208B. As used herein, "flush" means that a surface profile formed from the conductive sheets 208A and 208B and the interconnect 210A is at least substantially flat with minimal surface defects. In further configurations, the amount of the particles 330 allowed to collect in the electrical disconnect 332 may be enough so that the interconnect 210A is higher than the top plane of the conductive sheets 208A and 208B. It should be noted that the concepts and technologies described herein are not limited to any particular shape, amount or form of metal deposited to form the interconnect 210A.

Additionally, a described above, the particles 330 may be formed from one or more metals, creating a mixture of metals forming the metal interconnect 210A. These and other configurations are considered to be within the scope of the present disclosure. In a manner similar to the filling of the electrical disconnect 332, the electrical disconnect 334 can be filled as well. In some implementations, the electrical disconnect 332 and the electrical disconnect 334 can be filled simultaneously or in some other order. For example, a composite structure, such as the wing 300 of FIG. 3, can be located to receive the particles 330 at one time. These and other plasma deposition techniques are considered to be within the scope of the present disclosure.

Figure 5:
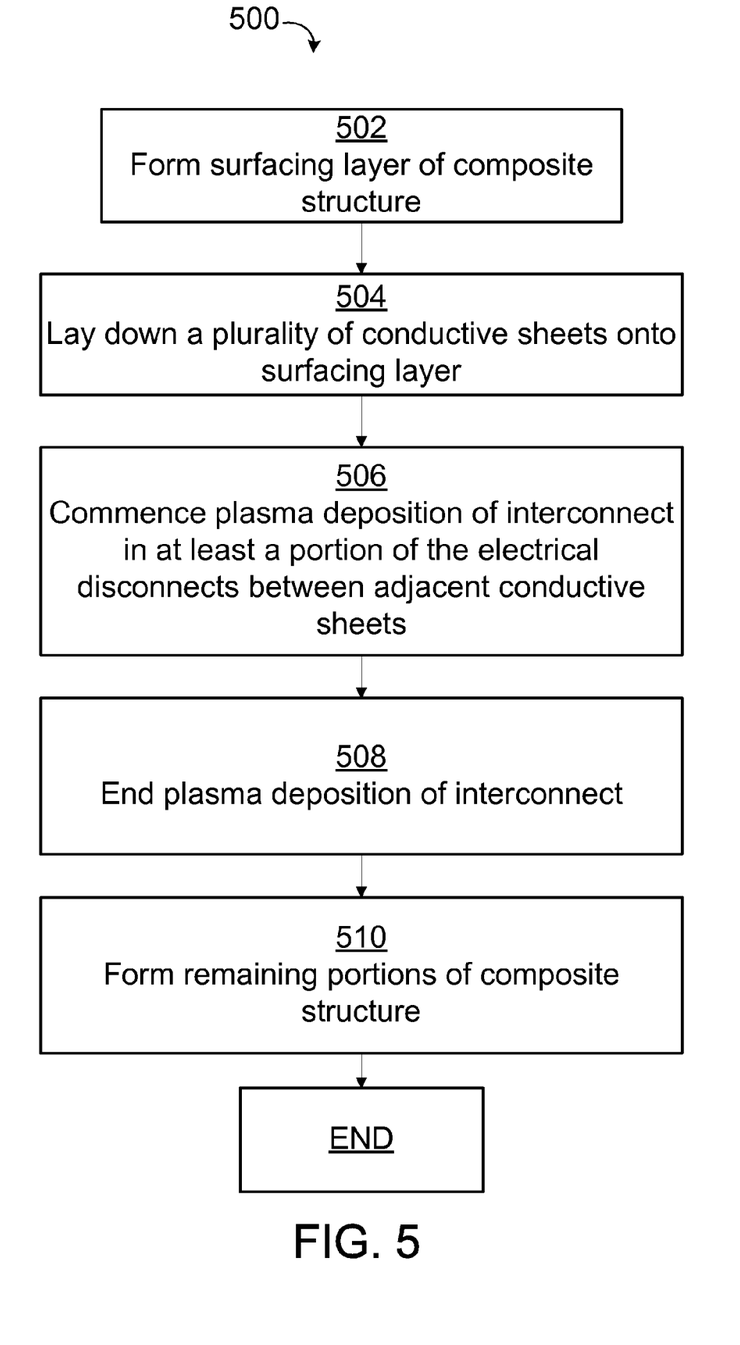
FIG. 5 illustrates a logic flowchart of a method for forming an ohmic connection between conductive sheets using metal deposition, in accordance with an embodiment.

Turning now to FIG. 5, an illustrative routine for ohmically connecting adjacent expanded metal foil sections in a partial composite structure is described in detail. Unless otherwise indicated, it should be appreciated that more or fewer operations may be performed than shown in the figures and described herein. Additionally, unless otherwise indicated, these operations may also be performed in a different order than those described herein.

Routine 500 begins at operation 502, where a surfacing layer 206 is formed. In some implementations, the surfacing layer 206 includes one or more layers of fiberglass or other material. In certain implementations, the surfacing layer 206 forms the outer part of the composite structure upon which paint will be applied to finish the structure. From operation 502, the routine 500 continues to operation 504, where a plurality of conductive sheets 208A-208C are laid down onto the surfacing layer 206. In some implementations, the conductive sheets 208A-208C are provided by a manufacturer in rolls, whereby the aircraft component manufacture unrolls the conductive sheets 208A-208C into strips on the surfacing layer 206. The conductive sheets 208A-208C can be placed in a position relative to each other suitable for a plasma deposition process. It should be appreciated that the conductive sheets 208A-208C, for example, copper foil or expanded copper foil, may be laid down as a bonded system with the surfacing layer 206. In that configuration, the deposition of the metal from the plasma deposition process may be over a step instead of a butt joint.

From operation 504, the routine 500 continues to operation 506, where the plasma deposition of metal to form the interconnects 210A and 210B is commenced. As described above, the deposition of metal may be performed using various metal deposition techniques. The use of plasma deposition is merely exemplary and for purposes of illustration only. In some configurations, the metal is deposited in such a manner as to ohmically connect at least a portion of adjacent edges of the conductive sheets 208A-208C. In other configurations, the metal can be deposited in such a manner as to physically connect at least a portion of adjacent edges of the conductive sheets 208A-208C.

From operation 506, the routine 500 continues to operation 508, where the deposition of metal to form the interconnects 210A and 210B is ceased. The amount and type of metal, including various alloys of metal or other components, is determined based on various design considerations. As described above, the amount of metal forming the metal interconnects can be varied to create relatively stronger physical or electrical bonds. From operation 508, the routine 500 continues to operation 510, where the remaining parts of the composite structure are formed. For example, FIG. 2 illustrates the composite structure 200 having the isolation layer 212 and the support core 214. In some configurations, the support core 214 is encapsulated by carbon plies 216 and 218.

Figure 6:
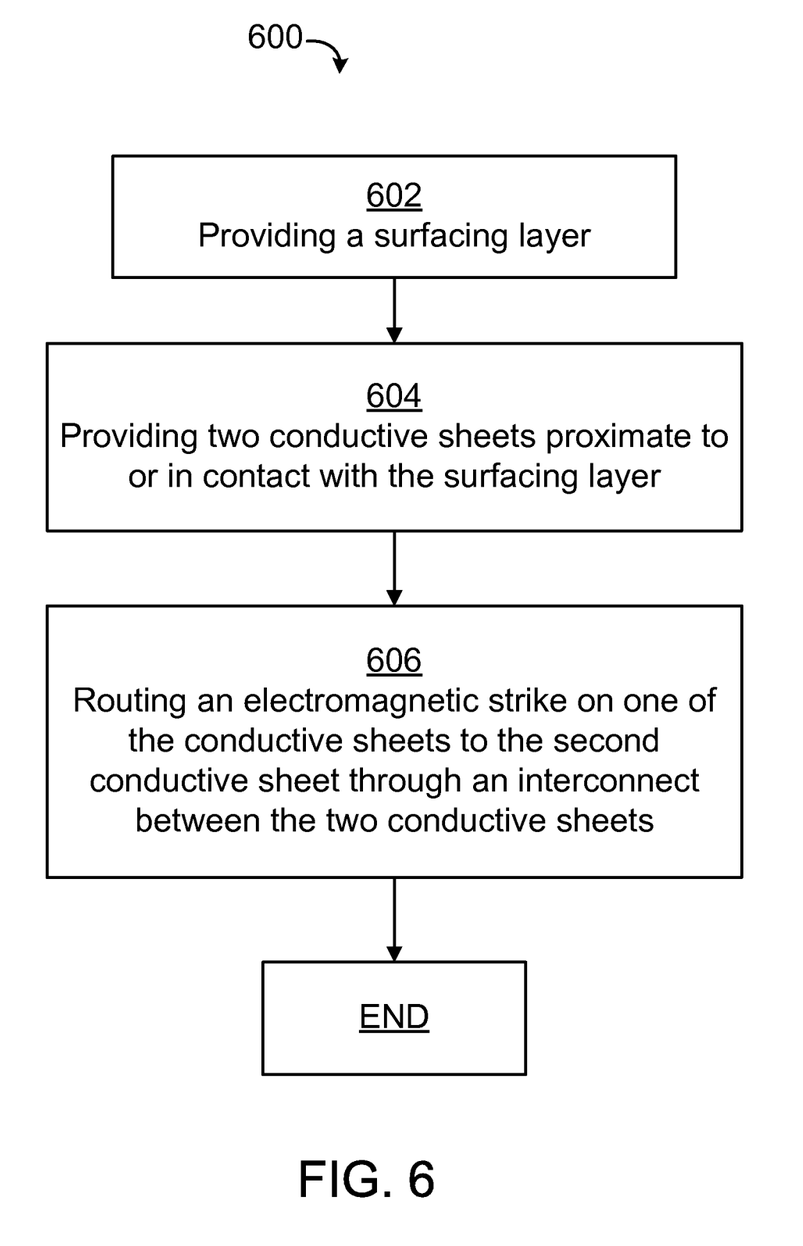
FIG. 6 illustrates a logical flowchart of a method for providing electromagnetic energy strike protection in an aircraft component, in accordance with an embodiment.

Turning now to FIG. 6, an illustrative routine for providing electromagnetic energy strike protection in an aircraft component is described in detail. Unless otherwise indicated, it should be appreciated that more or fewer operations may be performed than shown in the figures and described herein. Additionally, unless otherwise indicated, these operations may also be performed in a different order than those described herein.

Routine 600 begins at operation 602, where a composite structure for the aircraft component is provided. In some instances, the composite structure has a surfacing layer. From operation 602, the routine 600 continues to operation 604, where a plurality of conductive sheets are provided. In some configurations, the conductive sheets are proximate to or in contact with the surfacing layer. In other configurations, the conductive sheets are metal sheets. In further configurations, the conductive sheets are expanded metal foil sheets or mesh. When laying down the conductive sheets, electrical disconnects may be present between two of the conductive sheets. The electrical disconnects can be gaps or spaces between the conductive sheets. From operation 604, the routine 600 continues to operation 606, where an electromagnetic strike on at least one conductive sheet of the plurality of conductive sheets is routed to a second conductive sheet of the plurality of conductive sheets through at least one interconnect. In some configurations, the interconnect is a conductive material deposited in the electrical disconnect. In some configurations, the interconnect can be a metal deposited using a plasma deposition process.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. An aircraft component having a composite structure, the aircraft component comprising:
   a surfacing layer and an isolation layer;
   a support core layer and a plurality of layers of carbon plies encapsulating the support core layer, a first layer of the plurality of layers of carbon plies disposed adjacent to the isolation layer along a first side thereof;
   a conductive layer disposed between the surfacing layer and a second side of the isolation layer opposing the first side, the conductive layer including a plurality of conductive sheets disposed in a co-planar arrangement with each other, the plurality of conductive sheets forming one or more electrical disconnect regions each defined by a respective gap between adjacent conductive sheets within the conductive layer; and
   one or more conductive interconnects forming ohmic connections between adjacent edges of the adjacent conductive sheets to thereby bridge the gap in the one or more electrical disconnect regions, wherein the one or more interconnects are disposed within the co-planar arrangement and configured to route an electromagnetic strike between the adjacent conductive sheets.

2. The aircraft component of claim 1, wherein the plurality of conductive sheets comprises a plurality of sections of an expanded metal foil sheet,
   wherein the expanded metal foil sheet defines one or more slits between adjacent sections of the plurality of sections, and
   wherein the one or more slits define the one or more electrical disconnect regions.

3. The aircraft component of claim 1, wherein the one or more conductive interconnects and the adjacent conductive sheets define a substantially flat surface of the conductive layer.

4. The aircraft component of claim 1, wherein the plurality of conductive sheets comprises a plurality of individual conductive strips.

5. The aircraft component of claim 1, wherein the plurality of layers of carbon plies further comprises a second layer of carbon plies, wherein the first layer of carbon plies is adjacent to the support core layer along a first side thereof, and wherein the second layer of carbon plies is adjacent to the support core layer along an opposing second side thereof.

6. The aircraft component of claim 1, wherein the adjacent conductive sheets define a top plane, and wherein the one or more conductive interconnects extend past the top plane.

7. The aircraft component of claim 1, wherein the one or more conductive interconnects comprises a plurality of conductive interconnects.

8. The aircraft component of claim 7, wherein the plurality of conductive interconnects comprises:
   a first interconnect disposed between first and second conductive sheets of the plurality of conductive sheets; and
   a second interconnect disposed between the second conductive sheet and a third conductive sheet of the plurality of conductive sheets.

9. A method for forming an electromagnetic strike protection structure for an aircraft component, the method comprising:
   arranging, on a surfacing layer for a composite structure, a conductive layer that includes a plurality of conductive sheets disposed in a co-planar arrangement with each other, the plurality of conductive sheets forming one or more electrical disconnect regions each defined by a respective gap between adjacent conductive sheets within the conductive layer;
   depositing, using a predetermined deposition process, one or more conductive interconnects to ohmically connect adjacent edges of the adjacent conductive sheets to thereby bridge the gap in the one or more electrical disconnect regions, wherein the one or more interconnects are disposed within the co-planar arrangement and configured to route an electromagnetic strike between the adjacent conductive sheets;
   arranging, within the composite structure, an isolation layer such that a first side of the isolation layer is disposed adjacent to the conductive layer; and
   arranging, within the composite structure, a first layer of carbon plies adjacent to a second side of the isolation layer opposite the first side,
   wherein the first layer of carbon plies and a second layer of carbon plies encapsulate a support core layer of the composite structure.

10. The method of claim 9, wherein the plurality of conductive sheets comprises a plurality of sections of a metal foil sheet, wherein the metal foil sheet defines one or more slits between adjacent sections of the plurality of sections, wherein the one or more slits define the one or more electrical disconnect regions.

11. The method of claim 9, wherein depositing one or more conductive interconnects is performed using a plasma deposition process.

12. The method of claim 9, wherein the plurality of conductive sheets comprises a plurality of individual conductive strips, the method further comprising:
   arranging the individual conductive strips with relative positioning based on the predetermined deposition process.

13. The method of claim 9, further comprising:
   preparing, near a leading edge or a trailing edge of at least one of the adjacent conductive sheets, a surface of the at least one of the adjacent conductive sheets,
   wherein depositing the one or more conductive interconnects comprises depositing conductive material at the prepared surface.

14. The method of claim 9, further comprising applying a pulling force to the metal foil sheet to form an expanded metal foil sheet.

15. The method of claim 9, wherein depositing one or more conductive interconnects operates to define a substantially flat surface of the conductive layer.

16. The method of claim 9, wherein the adjacent conductive sheets define a top plane, and wherein the one or more conductive interconnects extend past the top plane.

17. A method for providing electromagnetic energy strike protection in an aircraft component, the method comprising:
   arranging, on a surfacing layer for a composite structure, a conductive layer comprising a first conductive sheet and a second conductive sheet disposed in a co-planar arrangement with each other;
   depositing one or more conductive interconnects within the co-planar arrangement using a deposition process, the one or more conductive interconnects ohmically connecting adjacent edges of the first conductive sheet and the second conductive sheet, wherein the interconnect is coplanar with the first conductive sheet and the second conductive sheet;

arranging, within the composite structure, an isolation layer such that a first side of the isolation layer is disposed adjacent to the conductive layer; and arranging, within the composite structure, a first layer of carbon plies adjacent to a second side of the isolation layer opposite the first side, wherein the first layer of carbon plies and a second layer of carbon plies encapsulate a support core layer of the composite structure; and routing an electromagnetic strike on the first conductive sheet to the second conductive sheet through the one or more conductive interconnects.

18. The method of claim 17, wherein the first conductive sheet and the second conductive sheet comprise respective sections of a metal foil sheet, the metal foil sheet defining one or more slits between adjacent sections, the one or more slits define the one or more electrical disconnect regions.

19. The method of claim 17, wherein depositing one or more conductive interconnects is performed using a plasma deposition process.

20. The method of claim 17, further comprising applying a pulling force to the metal foil sheet to form an expanded metal foil sheet.

* * * * *